United States Patent [19]

Jones et al.

[11] Patent Number: 4,794,480
[45] Date of Patent: * Dec. 27, 1988

[54] BERNOULLI PLATE IN CARTRIDGE

[75] Inventors: David E. Jones; Randall C. Bauck, both of Layton; Robert D Freeman, Roy, all of Utah

[73] Assignee: Iomega Corporation, Roy, Utah

[*] Notice: The portion of the term of this patent subsequent to Apr. 26, 2005 has been disclaimed.

[21] Appl. No.: 854,130

[22] Filed: Apr. 21, 1986

[51] Int. Cl.⁴ .................. G11B 17/32; G11B 5/016; G11B 5/54; G11B 23/033

[52] U.S. Cl. .................. 360/99.04; 360/102; 360/106; 360/133

[58] Field of Search .................. 360/86, 97–99, 360/102, 133, 135; 369/261, 289, 291; 206/444

[56] References Cited

U.S. PATENT DOCUMENTS

| | | | |
|---|---|---|---|
| 3,593,327 | 7/1971 | Shill | 340/174.1 |
| 3,772,665 | 11/1973 | Hertrich | 360/133 X |
| 3,815,150 | 6/1974 | Stoddard et al. | 360/97 |
| 3,940,793 | 2/1976 | Bleiman | 360/99 |
| 3,947,886 | 3/1976 | Hiedecker et al. | 360/99 |
| 3,975,768 | 8/1976 | Jacques et al. | 360/99 |
| 4,001,888 | 1/1977 | Morgan | 360/99 |
| 4,074,330 | 2/1978 | Norton | 360/102 |
| 4,125,883 | 11/1978 | Rolph | 360/99 |
| 4,131,199 | 12/1978 | Hatchett et al. | 206/444 |
| 4,151,573 | 4/1979 | Tandon et al. | 360/105 |
| 4,159,494 | 6/1979 | Evans | 360/133 |
| 4,229,774 | 10/1980 | Janssen | 360/102 X |
| 4,414,591 | 11/1983 | Wenner | 360/97 |
| 4,423,449 | 12/1983 | Hasegawa | 360/99 |
| 4,447,899 | 5/1984 | Geyer | 360/102 X |
| 4,502,083 | 2/1985 | Bauck | 360/97 |
| 4,603,362 | 7/1986 | Sendelweck | 360/97 |
| 4,613,921 | 9/1986 | Holmes | 360/133 |
| 4,622,607 | 11/1986 | Smith | 360/97 |
| 4,630,728 | 12/1986 | Matsumoto et al. | 360/133 X |
| 4,641,209 | 2/1987 | Smith | 360/86 |
| 4,661,875 | 4/1987 | Kinjo | 360/133 |

FOREIGN PATENT DOCUMENTS

| | | | |
|---|---|---|---|
| 0137965 | 4/1985 | European Pat. Off. | 360/133 |
| 0146656 | 7/1985 | European Pat. Off. | 360/133 |
| 58-125279 | 7/1983 | Japan | |
| 58-158085 | 9/1983 | Japan | 360/99 |
| 58-164070 | 9/1983 | Japan . | |
| 59-87677 | 5/1984 | Japan . | |
| 60-229284 | 11/1985 | Japan . | |
| 594527 | 2/1978 | U.S.S.R. . | |
| 1441024 | 11/1973 | United Kingdom . | |
| 1416384 | 12/1975 | United Kingdom . | |
| 1417780 | 12/1975 | United Kingdom . | |
| 1432193 | 4/1976 | United Kingdom . | |

OTHER PUBLICATIONS

Hatchett, "Dual-Use Data Cartridge", *IBM Tech. Disc. Bull.*, vol. 23, No. 4, Sep., 1980.
Bothun, "Diskette with Slotted Load Pad Area", *IBM Tech. Disc. Bull.*, vol. 25, No. 7A, Dec., 1982.
Carmichael and Feliss, IBM Technical Disc. Bulletin, vol. 20, No. 11A, Apr., 1978.
McMurty, IBM Technical Disclosure Bulletin, vol. 19, No. 9, Feb., 1977.
IBM T.D.B., vol. 20, #3, Aug. 1977; J. R. Cope; Bernoulli Disk Decoupler & Stabilizer, pp. 916–917; Cl. 360, sub 102.
Beach et al., "Removable Disk Pack Assemblies", IBM Technical Disc. Bulletin, vol. 21, No. 3, Aug., 1978.

*Primary Examiner*—Stuart N. Hecker
*Assistant Examiner*—Benjamin E. Urcia
*Attorney, Agent, or Firm*—Woodcock Washburn Kurtz Mackiewicz & Norris

[57] ABSTRACT

A magnetic storage device comprising a rigid apertured cartridge containing a flexible magnetic disk and a Bernoulli surface is disclosed. The cartridge contains a reference surface which is integral with the Bernoulli surface and serves to align and flatten the Bernoulli surface when the cartridge is inserted into a disk drive. The cartridge is configured such that the flexible magnetic disk is maintained in operative association with the Bernoulli surface. The aperture of the cartridge serves as an entry point for the motor spindle and transducer of the disk drive. The cartridge is partially enclosed by a slidable shutter which protects the Bernoulli surface and flexible disk when the cartridge is not in use.

2 Claims, 10 Drawing Sheets

BERNOULLI PLATE IN CARTRIDGE

RELATED APPLICATIONS

This application is related by subject matter to the following commonly assigned co-pending applications, all of which are incorporated herein by reference: application Ser. Nos. 854,342, 854,333, now U.S. Pat. Nos. 4,740,851 and 854,292 now U.S. Pat. No. 4,743,789 all filed Apr. 21, 1986.

BACKGROUND OF THE INVENTION

This invention relates to magnetic storage devices, and more particularly to a flexible magnetic disk contained in a rigid cartridge having a Bernoulli surface against which the disk is rotated.

Flexible or "floppy" disks are frequently used as a magnetic storage medium because of their portability and low cost. These disks are called "floppy" because they tend to sag away from their center when not otherwise supported. The space between a magnetic disc and the transducer is critical for proper non-contact data recording and pick-up. It has been common practice in the art to flatten and stabilize the floppy disk during the read/write operation by rotating the disk at high speeds in close juxtaposition to a flat plate sometimes called a Bernoulli plate. In this way, an air bearing is formed between the plate and disk such that the gap between the record surface and the plate is held constant. In order for the Bernoulli plate to be effective, however, it is important that the surface of the plate is flat and rigid, especially in the region of the plate where the transducer is employed. For this reason, most applications have fixed the Bernoulli plate completely or partially within the disk drive. Examples of this type of device are shown in U.S. Pat. Nos. 3,947,886 - Hiedecker et al, 4,074,330 - Norton et al, and IBM Technical Disclosure Bulletin, Volume 20, No. 11A, of April 1978. One of the disadvantages of placing the plate within the disk drive is that any imperfection in the plate, such as accumulation of contaminants or warping, will require expensive repair and down time for the entire drive. Another disadvantage is the difficulty of ensuring proper plate to disk registry when the disk cartridge is inserted.

Rotating a magnetic disk in juxtaposition to a surface inside a cartridge is not new in the art. For example, see U.S. Pat. No. 3,772,665 - Hertrich. However, in order to make the cartridge reasonably portable, the size of the cartridge is necessarily restricted. As such, any Bernoulli surface contained within the cartridge must be relatively thin and therefore especially susceptible to warping and deformation. This warping and deformation will distort the plate to disk spacing and hence the critical spacing between the transducer and the disk.

SUMMARY OF THE INVENTION

In accordance with this invention, a flexible magnetic disk is enclosed in a rigid cartridge. Inside the cartridge is a Bernoulli surface in juxtaposition to which the disk s rotated. The Bernoulli srrface has an aperture therein through which the disk can be accessed by a transducer and a drive spindle. This aperture is formed to engage a clamping means inside the disk drive such that the Bernoulli surface will be held flat and rigid in the region surrounding the aperture when the rigid cartridge is inserted into the disk drive. In this way, the region of the Bernoulli surface where the transducer flies is held stable and firmly fixed despite any slight warping or deformation of the cartridge.

It is an object of the present invention to provide a magnetic disk cartridge containing a Bernoulli surface, wherein said Bernoulli surface is stabilized and held fixed when it is inserted into a disk drive.

It is another object of this invention to provide a stable environment for a rotating disk contained within a rigid cartridge so that a transducer can be brought into critical alignment with the rotating disk.

It is another object of this invention to provide an opening in a stabilized Bernoulli surface contained within a rigid cartridge through which each side of a magnetic disk can be accessed by a transducer, and through which the center of the disc can be accessed by a drive spindle.

It is another object of this invention to minimize exposure of a disk and a Bernoulli surface to contamination and damage by containing both within a rigid cartridge.

The foregoing and other objects and features of the present invention will be better understood from the following more detailed description and appended claims.

DETAILED DESCRIPTION

Two preferred embodiments of the present invention will be described in detail below. The description of the first embodiment includes a description of the features common to both. Following thereafter is a description of the second and more preferred embodiment of this invention insofar as it differs from the first embodiment.

DESCRIPTION OF THE FIRST EMBODIMENT

Figure 1:
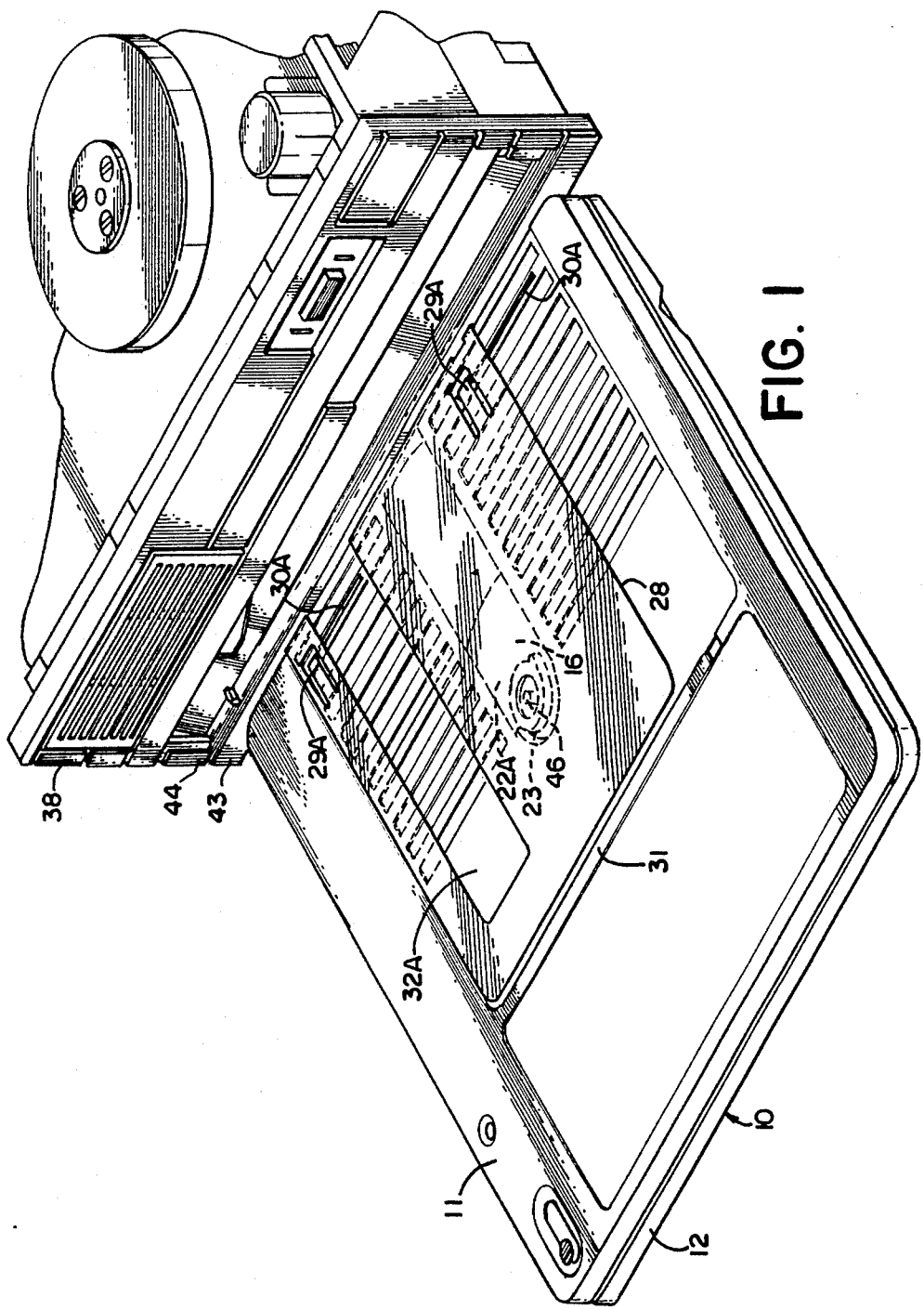
FIG. 1 is a perspective view from above of the assembled cartridge of a first embodiment and a fragmentary perspective view of a disk drive in which it can be used, showing the relative positions of each just prior to insertion of the cartridge into the drive.

FIG. 1 is a perspective view from above of disk cartridge 10 in a pre-entry position relative to disk drive 38 in which it will be used. Cartridge 10 enters disk drive 38 through opening 43. Opening 43 is normally closed by a hinged door 44 which is forced to an open position when cartridge 10 is inserted into disk drive 38. Cartridge 10 is enclosed by a protective slidable shutter 28 which normally covers opening 16 in cartridge 10. Opening 16 is represented in phantom in FIG. 1 by the dashed lines extending radially from the center of the cartridge. When the cartridge is inserted into disk drive 38, shutter 28 is moved to the right such that opening 32A in shutter 28 is coincidental with opening 16 in cartridge 10. The device for moving the shutter to this open position is described latter in the specification.

Figure 2:
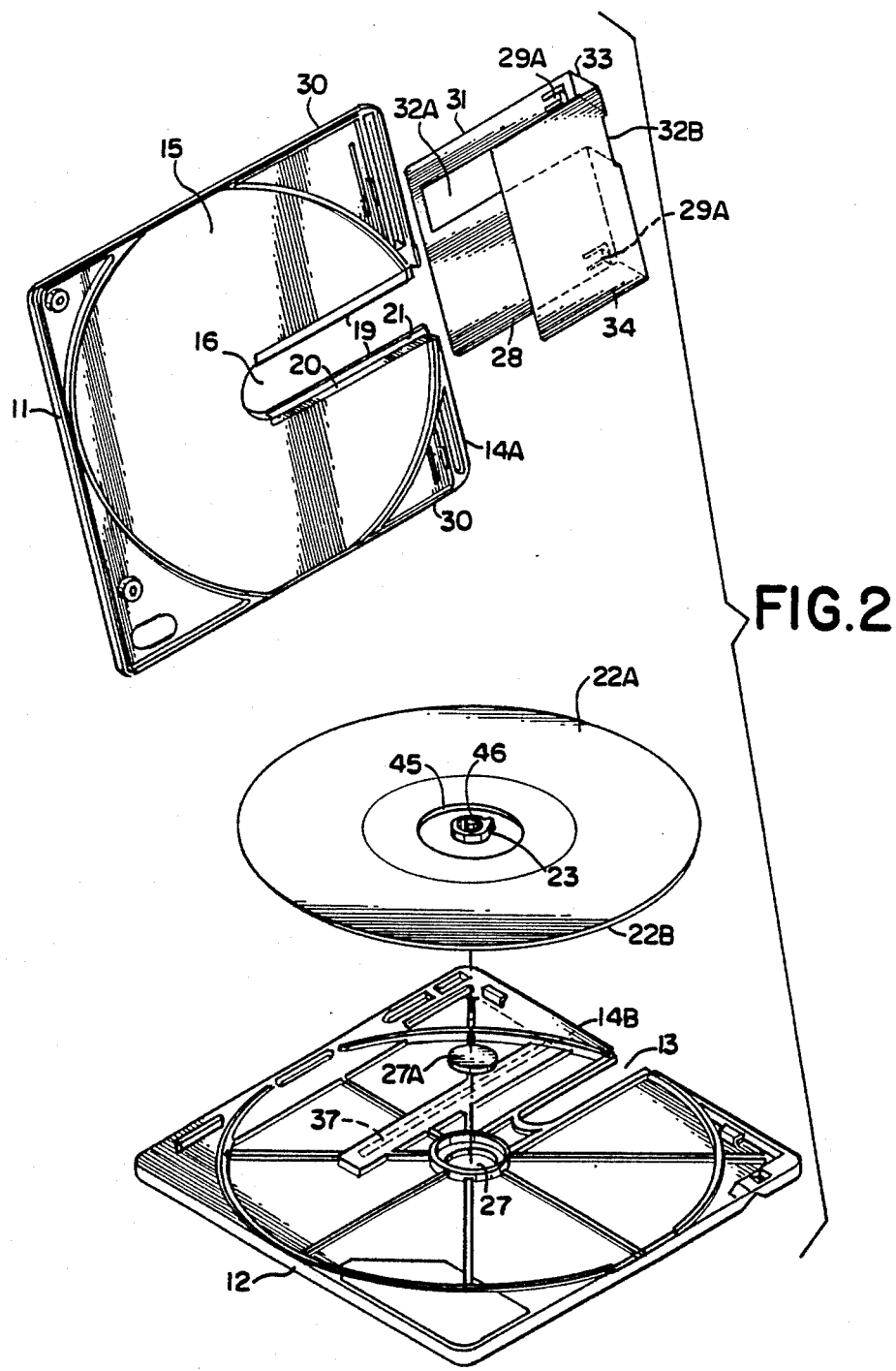
FIG. 2 is an exploded perspective view of the disk cartridge of the first embodiment of the present invention which shows the interior surfaces of the cartridge, the disks contained within the cartridge, and the protective shutter for the cartridge.

FIG. 2 is an exploded perspective view of cartridge 10 showing: the inside surface of cartridge top 11, the inside surface of cartridge bottom 12, disks 22A and 22B axially spaced from their normal position in cartridge bottom 12, resilient member 27A axially spaced from its normal posiion in dishlike opening 27, and shutter 28 radially spaced from its normal enclosing position relative to cartridge 10. In assembled form, disks 22A and 22B are contained within the chamber formed by the joining of cartridge bottom 12 and cartridge top 11, and shutter 28 is slideably mounted on the cartridge.

The cartridge bottom 12 has an opening 13 extending from its leading edge 14B to a point short of the center of the cartridge. The cartridge top 11 contains a Bernoulli surface 15 on its inside face which substantially inscribes a circular area therein. The cartridge top 11 has an opening 16 which is coincidental with the opening 13 in the cartridge bottom 12 and extends from the leading edge 14A of cartridge top 10 to a point beyond the center of the cartridge.

A pair of rails 19 extend into opening 16 from the edge 20 of the opening. Rails 19 are made to be integral with the Bernoulli surface 15 and provide the following features: (1) any external stress applied to these rails is transmitted to the Bernoulli surface in the region of opening 16, and (2) the distance between the surface 21 of rails 19 and the Bernoulli surface 15 is fixed at a precise predetermined value. In the preferred embodiment of this invention, these features are achieved by forming the Bernoulli surface 15 and rails 19 from a single mold. In this way, an integral relationship exists between reference rails 19 and the Bernoulli surface 15. As such, any warping or deformation of Bernoulli surface 15 results in a similar warping or deformation of rails 19. Conversely, any flattening stress applied to rails 19 concomitantly flattens Bernoulli surface 15 in the region of aperture 16.

Figure 3A:
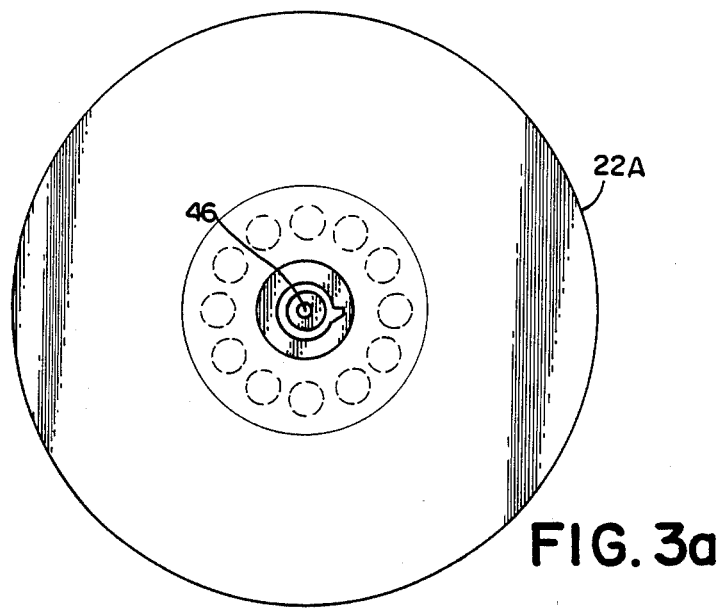
FIG. 3a is a top plan view of the disk pair made according to the first embodiment.
Figure 3B:
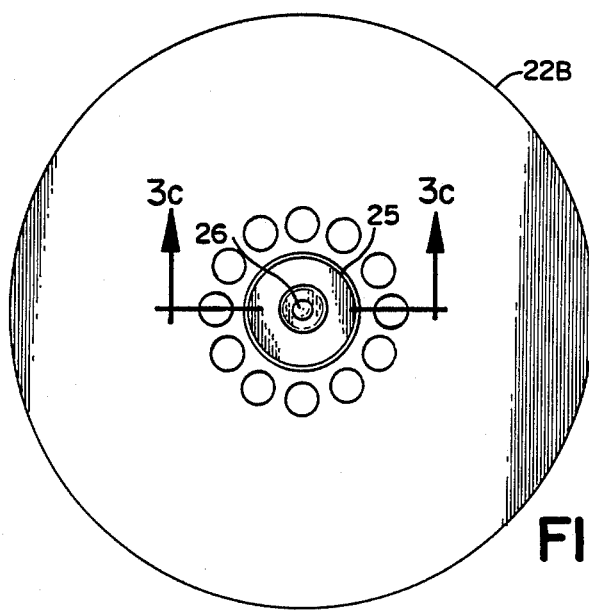
FIG. 3b is a bottom plan view of the disk pair made according to the first embodiment.
Figure 3C:
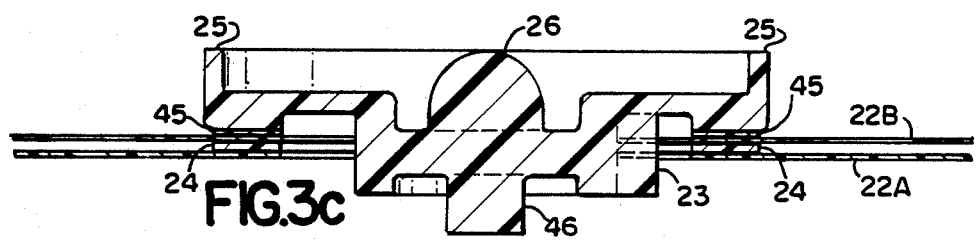
FIG. 3c is a cross sectional view of the disks of the first embodiment taken substantially along line 3c-3c of FIG. 3b, showing each disk and the hub to which they are attached.

Referring also to FIGS. 3a, 3b and 3c, a pair of disks 22A and 22B are contained within the cartridge. The outer surface of disk 22B is joined to disk hub 23 at surface 45. Disk spacer 24 is concentric with disk 22A and 22B and is joined integrally to each. The integral joining of disk spacer 24 with disk 22A and 22B is such that there is only a minimal glue layer between each disk and the disk spacer, and therefore an inconsequential gap between the surfaces of the disk spacer and the disks. One method which can be used to achieve this joining is to place a thin adhesive layer on each side of the spacer and then join the disks thereto.

The lower surface of disk hub 23 has a circumferential rim 25. A concentric knob 26 extends from the lower surface of disk hub 23 to the plane formed by circumferential rim 25. The lower surface of disk hub 23 sits in a dishlike opening 27 in cartridge bottom 12. The center of opening 27 is substantially in line with the center line of opening 16 in cartridge top 11 when the cartridge is assembled. Concentric knob 26 provides a low friction surface on which the magnetic disks can be rotated. Between the surface of dishlike opening 27 and concentric knob 26 is a resilient member 27A, which in this embodiment is an elastomeric disk. The elastomeric disk 27A exerts a constant force on knob 26, thus assuring that the outer surface of disk 22A is urged towards Bernoulli surface 15. The resilient member can be an elastomeric disk as shown, a dome shaped spring as described in the second embodiment of this invention, or any other device which serves the purpose of insuring juxtaposition of disk 22A with Bernoulli surface 15. The function and utility of the resilient member is disclosed more fully in co-pending application Ser. No. 854,333, filed Apr. 21, 1986.

Figure 4:
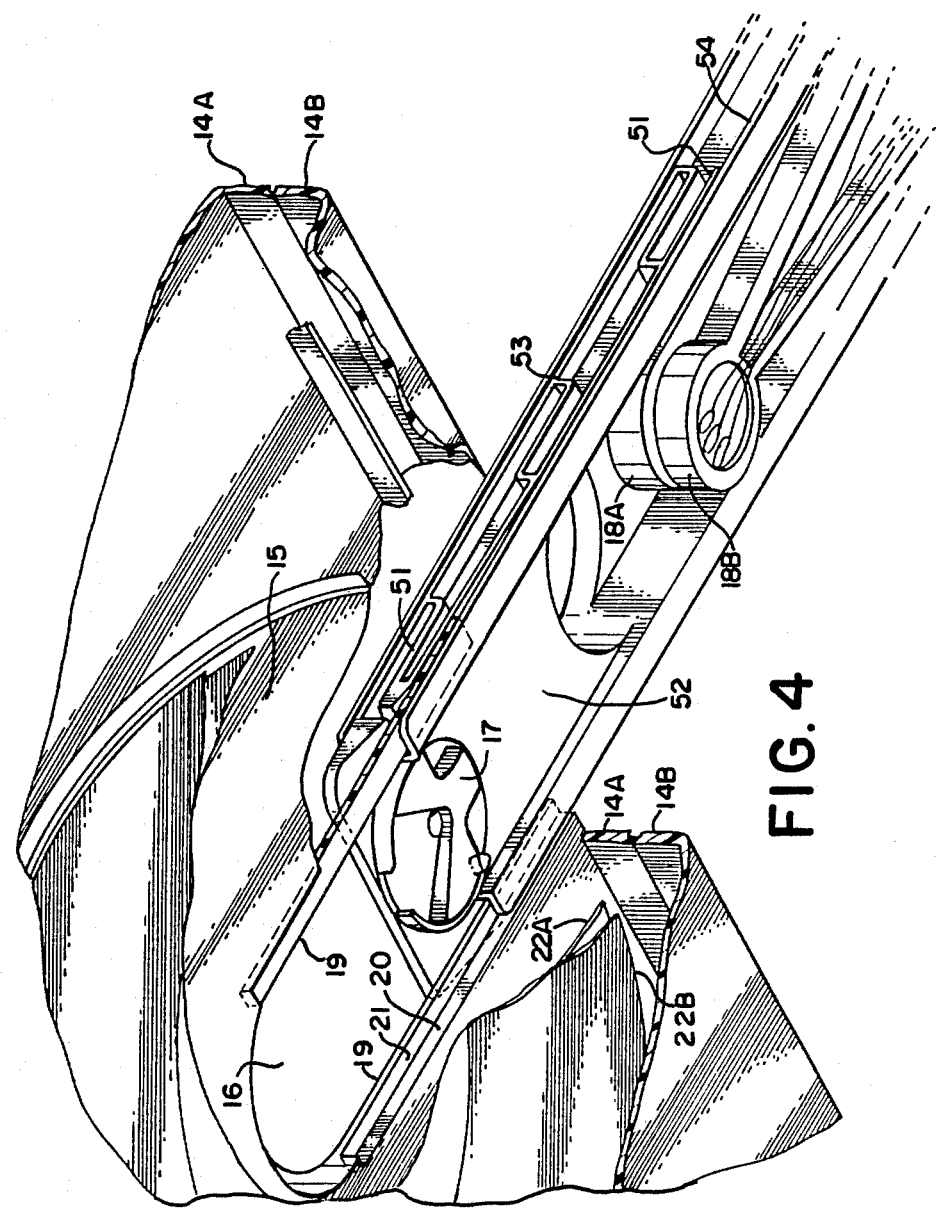
FIG. 4 is an exploded perspective view of a disk drive from below, which shows the assembled cartridge of the first embodiment partially inserted into the disk drive.

A disk drive made for use with this invention has a clamping means which locates rails 19 in a fixed position within the disk drive. Referring to FIG. 4, which is a cut away bottom perspective view of cartridge 10 partially inserted into the disk drive 38, this clamping means is a tapered rail 51 resiliently mounted to a spicule member 52 by a plurality of "S" shaped connections 53. Spicule member 52 is firmly mounted within disk drive 38. When the cartridge 10 is inserted into the disk drive 38, rails 19 are flattened against reference surface 54 by the force of resilient connections 53 exerted by rail 51. In a more preferred embodiment of this invention, a "U" shaped clamping means is used in place of the "S" shape members, as disclosed fully in co-pending application Ser. No. 854,419, filed Apr. 21, 1986, now U.S. Pat. No. 4,740,851. The stress provided thereby concomitantly flattens the Bernoulli surface 15 in the region of opening 16. This flattening action thus provides a stabilized Bernoulli surface in the region where the read/write function takes place.

Disks 22A and 22B contained within cartridge 10 can be simultaneously accessed, through openings 13 and 16, by a pair of transducers 18A and 18B slideably mounted to spicule member 52. When the cartridge 10 is fully inserted into disk drive 38, Bernoulli surface 15 is flat and fixed relative to spicule member 52. Transducer pair 18 then slide radially towards the disk pair 22 and axially sandwich the disk pair for simultaneous read/write functioning, as more fully disclosed in co-pending application Ser. Nos. 854,419, filed Apr. 21, 1986 and Ser. No. 854,292, also filed Apr. 21, 1986, now U.S. Pat. Nos. 4,740,851 and 4,743,989, respectively. The surface of motor spindle 17 is in rotatable engagement with the disk hub 23 when the cartridge 10 is fully inserted into the disk drive 38, as more fully disclosed in co-pending application Ser. No. 854,333, filed Apr. 21, 1986. Motor spindle 17 is rotatably mounted to spicule member 52, said motor spindle 17 having access to disk hub 23 through opening 16 in cartridge top 11.

Referring again to FIGS. 1 and 2, shutter 28 is seen to comprise a substantially "C" shaped member having a top surface 31, a front surface 33, and a back surface 34. Shutter 28 is slideably mounted to cartridge 10 for movement in a direction perpendicular to the center line of aperture 16. The top surface 31 of shutter 28 contains a pair of fingers 29A which protrude into a pair of slots 30A in cartridge top 11. Fingers 29A allow movement of the shutter 28 along the length of the slots 30A. The top surface 31 also contains an aperture 32A which is offset from opening 16 in cartridge top 11 when the shutter is in the closed position. When shutter 28 is in the open position, aperture 32A will be coincidental with opening 16 in cartridge top 11. When the shutter is in the open position and the cartridge 10 is within disk drive 38, the surfaces of disks 22 and disk hub 23 will be accessible by the transducers 18 and drive spindle 17 respectively.

Figure 5:
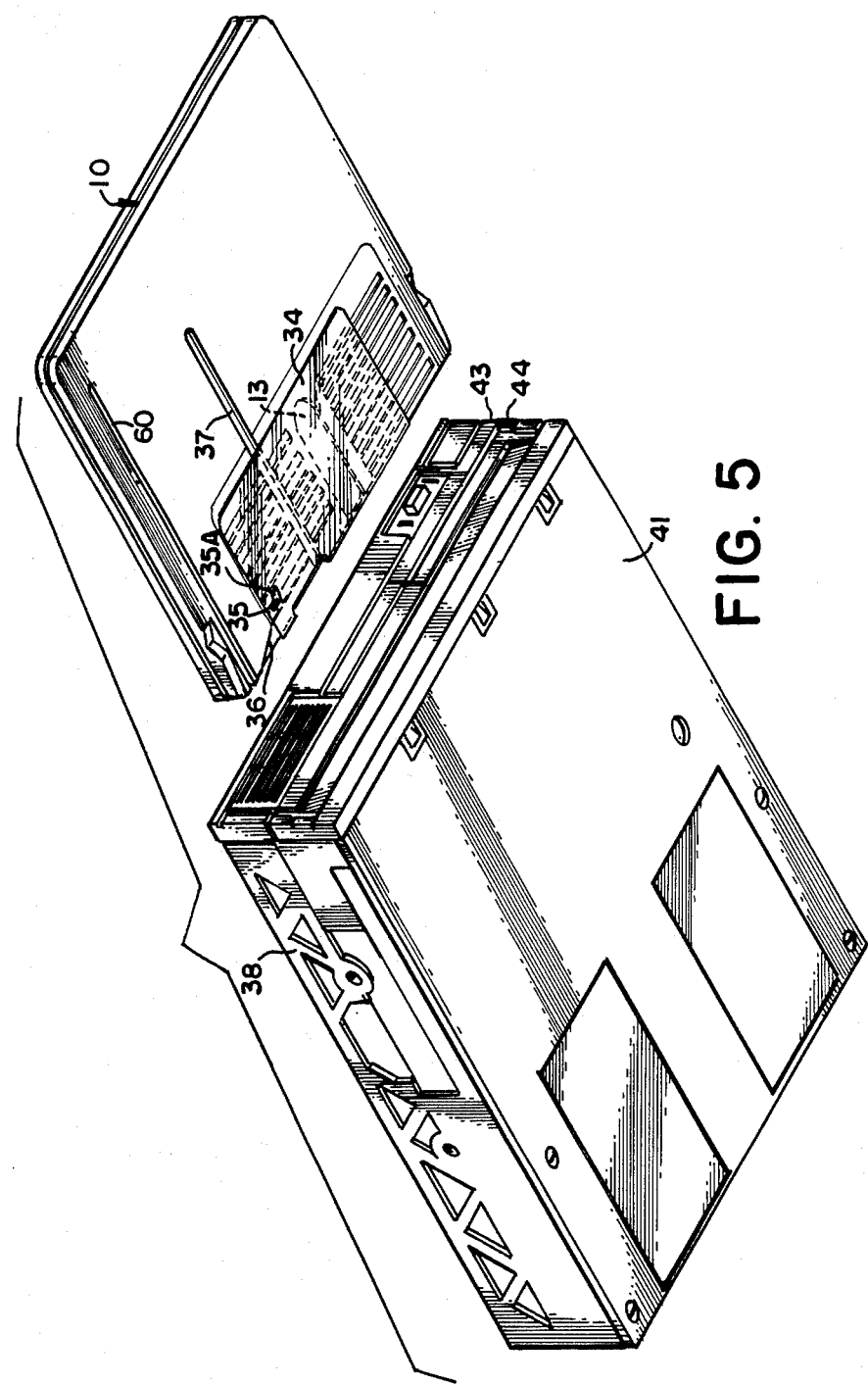
FIG. 5 is a perspective view from below the assembled cartridge of the first embodiment and a perspective view of a disk drive in which it is used, showing the relative positions of each just prior to insertion of the cartridge into the drive.
Figure 6A:
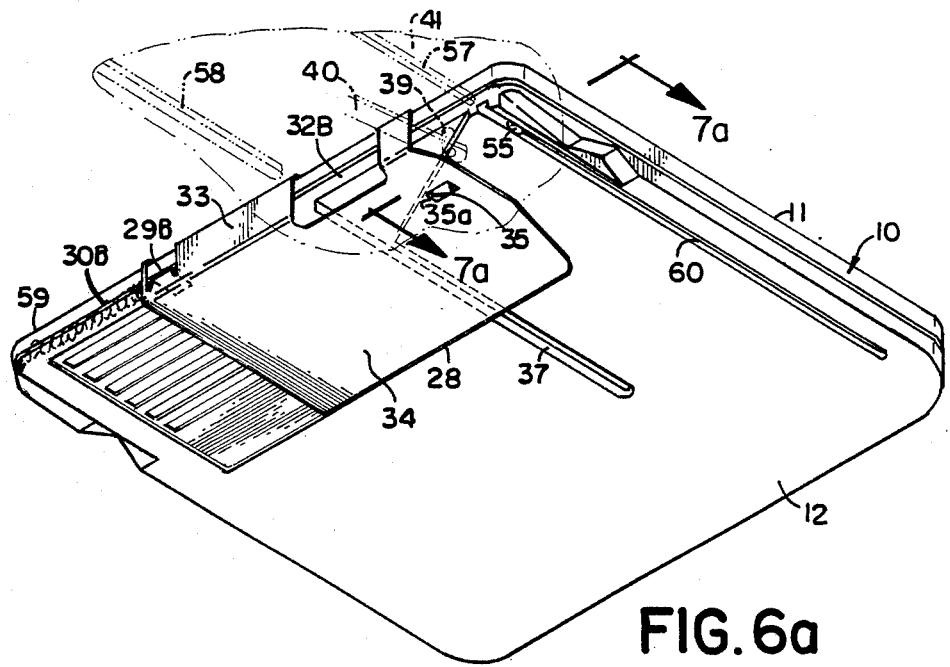
FIG. 6a is a detailed perspective view from below of a cartridge of the first embodiment of this invention as it would appear when partially inserted into a disk drive, showing in phantom the mechanism contained within the disk drive for unlocking and opening the cartridge shutter.
Figure 6B:
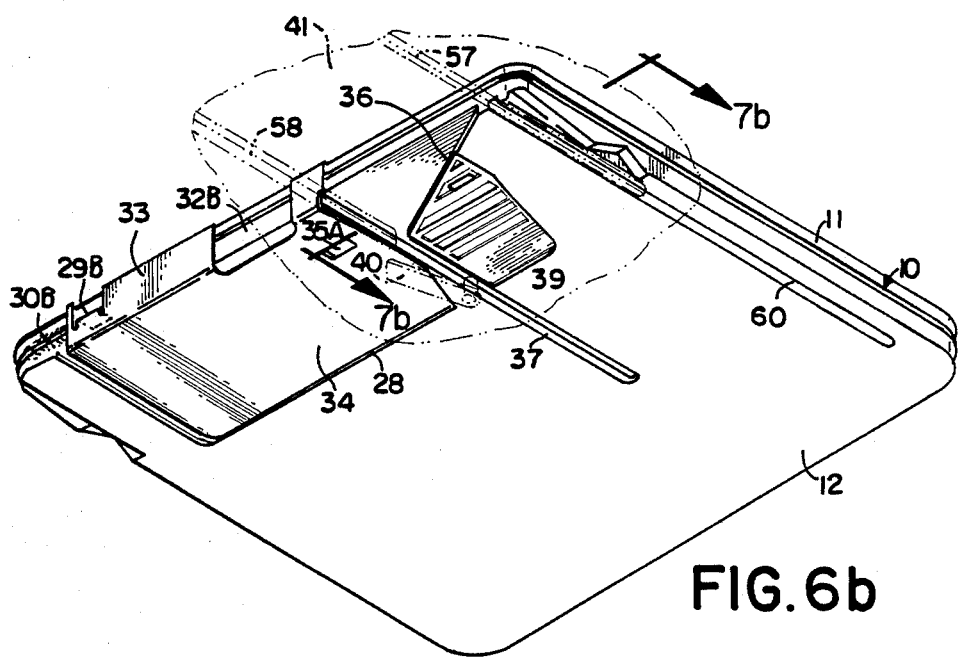
FIG. 6b is a perspective view from below of the cartridge of the first embodiment as it would appear when more fully inserted into a disk drive, showing the shutter in the open position.
Figure 7A:
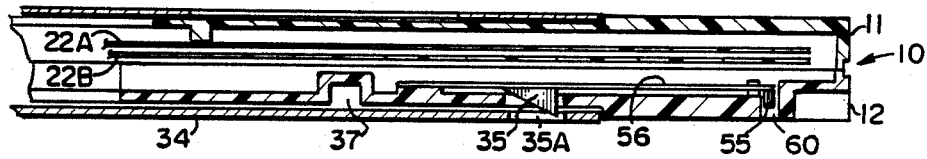
FIG. 7a is a cross sectional view of the cartridge according to the first embodiment taken substantially along line 7a-7a of FIG. 6b, showing the shutter in the closed position.
Figure 7B:
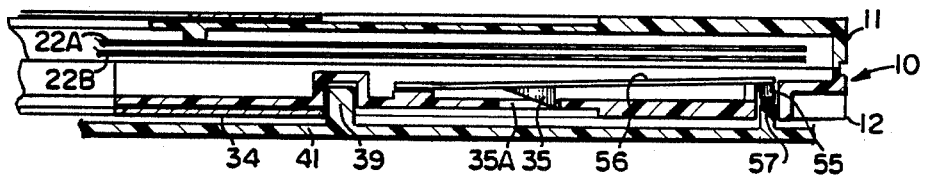
FIG. 7b is a cross sectional view of the cartridge according to the first embodiment taken substantially along line 7b–7b of FIG. 6b, showing the shutter in the open position.
Figure 8:
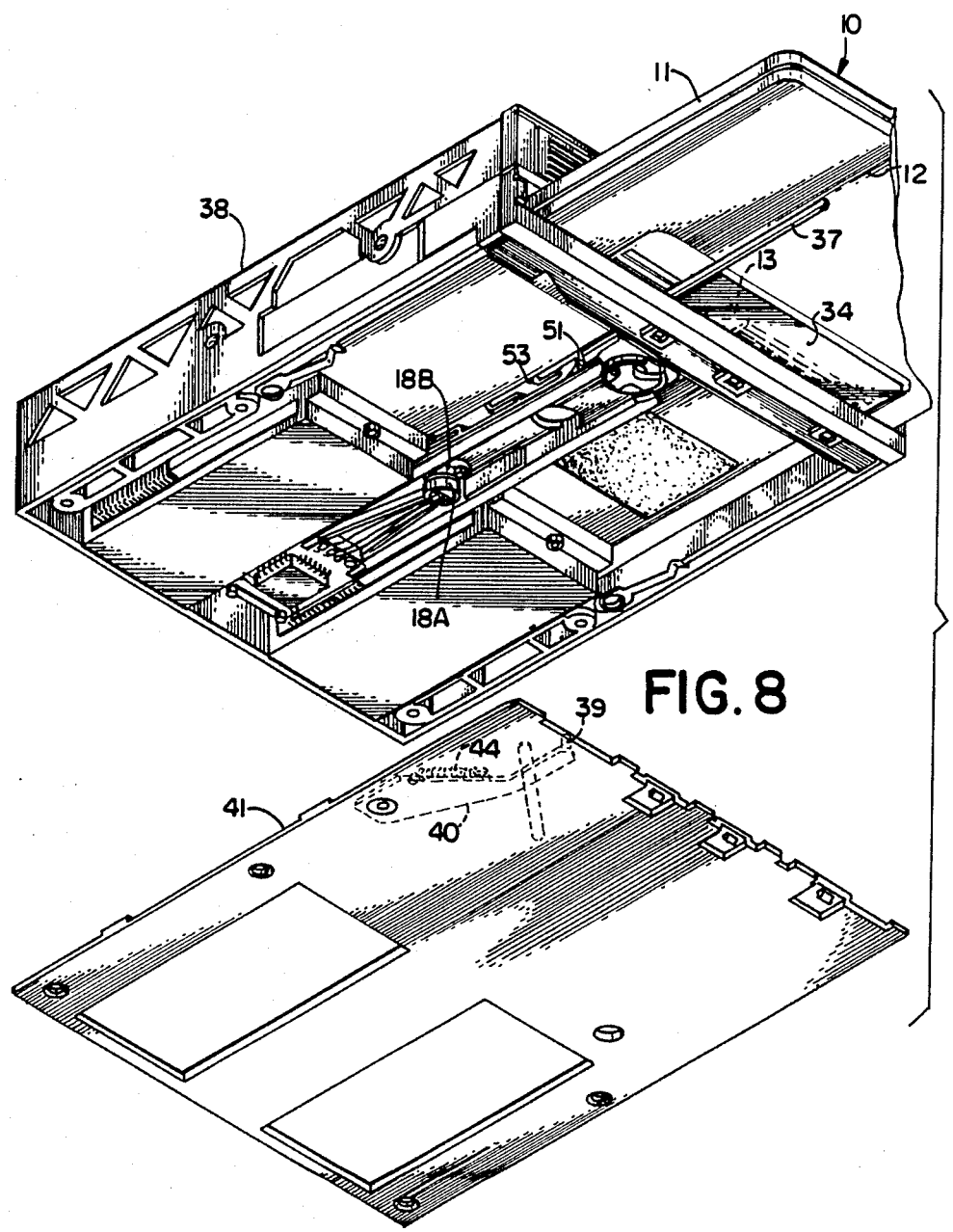
FIG. 8 is an exploded perspective view of a disk drive from below, which shows the assembled cartridge according to the first embodiment partially inserted into the disk drive.

Referring now to FIG. 5, cartridge 10 is seen from below in a perspective view as it is about to be inserted into disk drive 38 through slot 43. The back surface 34 of shutter 28 has a small aperture 35A through which locking pin 35 normally projects. Pin 35 interferes with the movement of shutter 28 and serves to lock it in place. The back surface 34 of shutter 28 is otherwise substantially unapertured and serves to cover opening 13 at all times. A perspective view of the cartridge 10 from below which shows cartridge bottom 12 as well as the leading edge 14 is shown in FIGS. 6a and 6b. FIGS. 6a and 6b show, in phantom, the mechanism used by this invention to unlock and open shutter 28. In FIG. 6a, cartridge 10 is revealed in a position in which it has just been inserted into drive 38 and is in initial engagement with the unlocking and opening mechanism, shown in phantom by dash lines, contained with the disk drive. In FIG. 6b cartridge 10 is revealed in a position in which it has been substantially insrrted into the disk drive 38 and the shutter is in the complete open position. FIGS. 7a and 7b show cross sectional views of FIGS. 6a and 6b respectively. Referring to FIGS. 6a and 7a, the outer surface of cartridge bottom 11 contains a long slot 60. Button 55 projects through an opening in slot 60. Button 55 is attached to one end of release arm 56. The other end of release arm 56 is resiliently mounted to the inner surface of cartridge bottom 11 such that button 55 is urged into the opening in slot 60. Locking pin 35 is mounted to release arm 56 and normally extends through an opening in cartridge bottom 11 and into opening 35A in shutter 28, thus locking the shutter in place. When locked in the closed position, the back surface 34 of shutter 28 substantially covers a large angular slot 36 in the outside surface of cartridge bottom 11. However, the leading edge of this slot is left uncovered when the shutter is closed. When cartridge 10 is inserted into disk drive 38, a first rib 57 molded into the bottom plate 41 of disk drive 38 enters slot 60 and depresses button 55. This in turn removes locking pin 35 from opening 35A, thus allowing shutter 28 to slide. A small pin 39 follows first rib 57 and enters the open portion of slot 36. Pin 39 is attached to arm 40, which is pivotally attached to the inside surface of bottom plate 41 (see FIG. 8). As cartridge 10 is inserted further into the disk drive 38, pin 39 is biased against shutter 28 as it follows the line of slot 36. The unlocked shutter then begins to slide into the open position as the cartridge is inserted into the disk drive. Shutter 28 follows a course determined by slots 30A in cartridge top 12 and slot 30B in the leading edge 14 of cartridge 10. Fingers 29A in the top surface 31 and finger 29B in the front surface 33 of shutter 28 extend into these slots respectively and travel along their length as the shutter is moved to the open position. Referring to FIGS. 6b and 7b, shutter 28 has been moved into the oomplete open position. Pin 39 has traveled along the edge of slot 36, opening shutter 28 in the process. Second rib 58 in the inner surface of bottom plate 41 follows pin 37 into long slot 37 and holds shutter 28 open when pin 39 moves beyond the end of the shutter. In the open position, openings 32A and 32B in the shutter are coincidental with openings 16 and 13. When cartridge 10 is removed from disk drive 38, a spring 44 urges arm 40 back into the start position and spring 59 in slot 30 urges shutter 28 to the closed position. Locking pin 35 is shaped to have its leading edge flush with the cartridge surface as shutter 28 moves back to the closed position. In this way, locking pin 35 will be depressed by the returning shutter 28 until the locking pin is coincidental with opening 35A, at which time resilient arm 56 pushes pin 35 into locking position in opening 35A.

DESCRIPTION OF THE SECOND EMBODIMENT

In the description of the second and more preferred embodiment that follows, features which are generally common to both the first and second embodiments of this invention have been designated by the same symbol used to describe the first embodiment. In addition, the second embodiment will be described in detail only so far as it differs from the description of the first embodiment.

Figure 9:
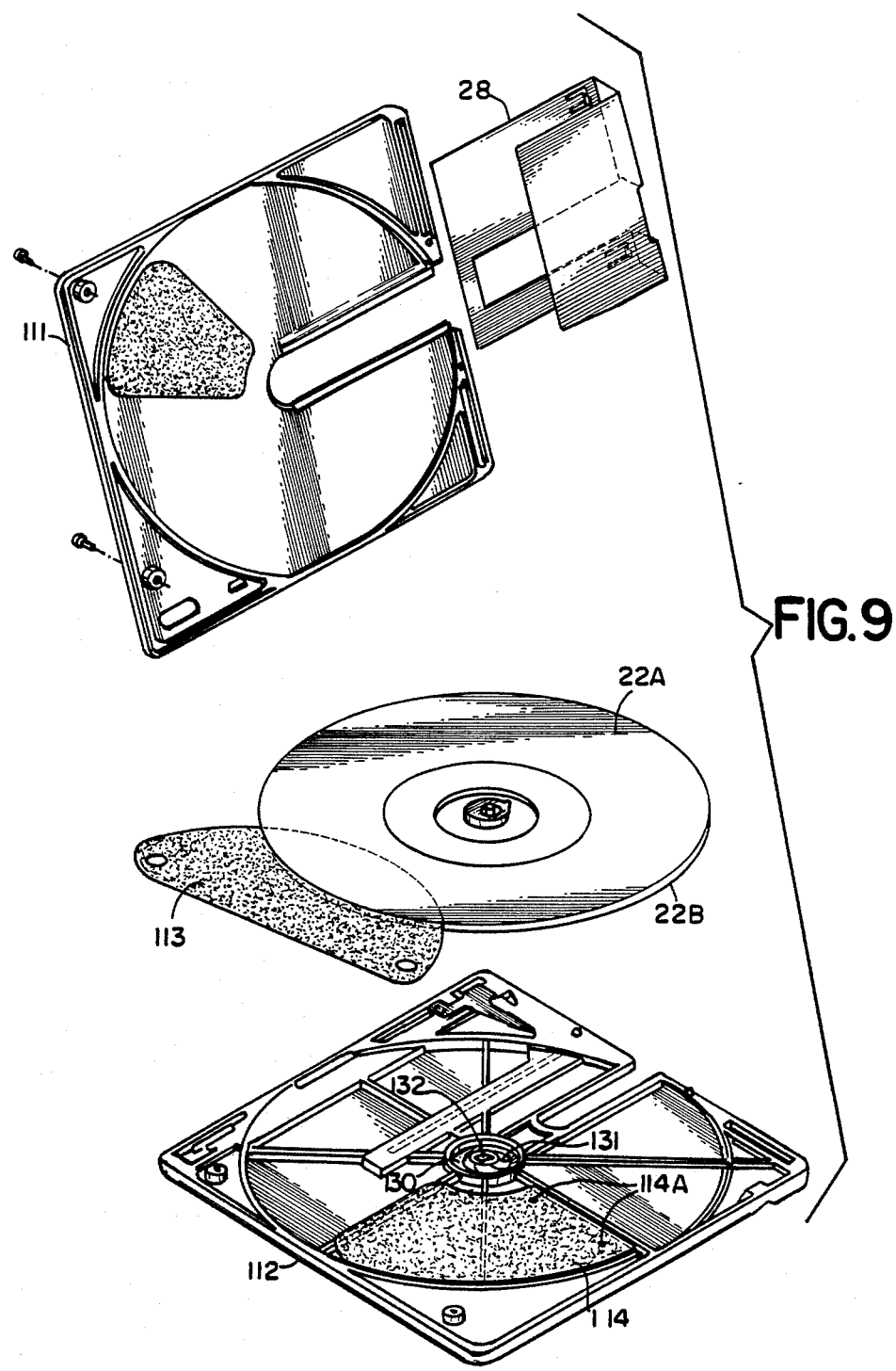
FIG. 9 is an exploded perspective view of the disk cartridge of the second embodiment of the present invention which shows the interior surfaces of the cartridge, the disks contained within the cartridge, and the protective shutter for the cartridge.

FIG. 9 is an exploded perspective view of cartridge 101 showing: the inside surface of cartridge top 111; the inside surface of cartridge bottom 112; inter disk wiper 113 sandwiched by disk pair 22A and 22B; and shutter 28. In assembled form, disks 22A and 22B are contained within the chamber formed by the joining of cartridge bottom 112 and cartridge top 111, and shutter 28 is slideably mounted on the cartridge. Bottom disk wiper 114 is heat staked to the cartridge bottom 112 at heat stake points 114A. When in assembled form, the lower surface of disk 22B contacts bottom disk wiper 114. When cartridge 101 is inserted into a disk drive and rotated thereby, any foreign materials on the underside of disk 22B are wiped away as the disk contacts bottom disk wiper 114. Inter-disk wiper 113 is sandwiched between disk 22A and disk 22B and serves to remove contaminates from between the disk pair as they rotate. Hold down nodes 116 in cartridge top 11 engage hold down nodes 117 in cartridge bottom 112 and hold inter disk wiper 113 within the cartridge and between the disks. Top wiper 115 is adhesively joined to Bernoulli surface 15 and wipes the upper surface of disk 22A as it rotates.

Since each of the wipers described above is in contact with a portion of the disk pair as it rotates, the placement and characteristics of the wipers are important features of this invention. In the view shown in FIG. 9, disk pair 22A and 22B is rotated in the clockwise direction when used in disk drive 38. In order to minimize the impact of the wipers on the stability of the rotating disks, it is preferred that all three wipers are located in the rear half of cartridge 10. It is also preferred that the top and bottom wipers are made from a suitable wiper laminant and that all three wipers are constructed so as to be substantially burr and tear free. In addition, the wipers are substantially flat and wrinkle free. Although the exact thickness of each wiper will depend upon the specific other dimensions of the cartridge, the wipers in no event are so thick as to interfere with the stability of the rotating disks.

The shape, location, and materials for the wipers in the most preferred embodiment of this invention will now be described. Bottom disk wiper 114 is a quarter moon shaped wiper located in the second quadrant of the cartridge, as measured from the point of view of the disk pair as they rotate past aperture 16. The wiper 114 is comprised of a nylon/rayon laminant wherein the nylon acts as a backing material to provide rigidity to the wiper and the rayon provides a textured wiping surface in contact with the disk. In the preferred embodiment, the bottom wiper is approximately 0.38 mm thick. Inter-disk wiper 113 is half moon shaped and is contained in the rear half of the cartridge. The inter-disk wiper is a non woven rayon/polypropylene blend. In the preferred embodiment of this invention the inter-disk wiper is approximatel 0.38 mm thick. Top wiper 115 is wedged shaped and contained in the second quadrant of the cartridge. This wiper is made of the same rayon/nylon laminant used for the bottom wiper 114. In the preferred embodiment wiper 114 is also 0.38 mm thick.

The resilient means for urging disk pair 22A and 22B towards Bernoulli surface 15 in this embodiment of the invention is a dome shaped sheet metal spring having spiral elements 131 providing resiliency. When the cartridge is assembled, the top of the spring 130 is substantially parallel to the Bernoulli surface 15. Adhesively mounted to the top of spring 130 is bearing surface 132. This bearing surface provides a hard, low friction, low wear surface upon which the lower portion of disk hub 18 rotates. In the preferred embodiment of this invention, bearing surface 132 is a thin sheet of glass integrally attached to dome spring 130. In another embodiment of this invention, bearing surface 132 may be eliminated if spring 130 is formed of a sufficiently hard material, such as nitrided stainless steel. Details concerning the resilient nature of the spiral elements of spring 130 are disclosed more fully in co-pending application Ser. No. 854,333, filed Apr. 21, 1986.

Figure 10A:
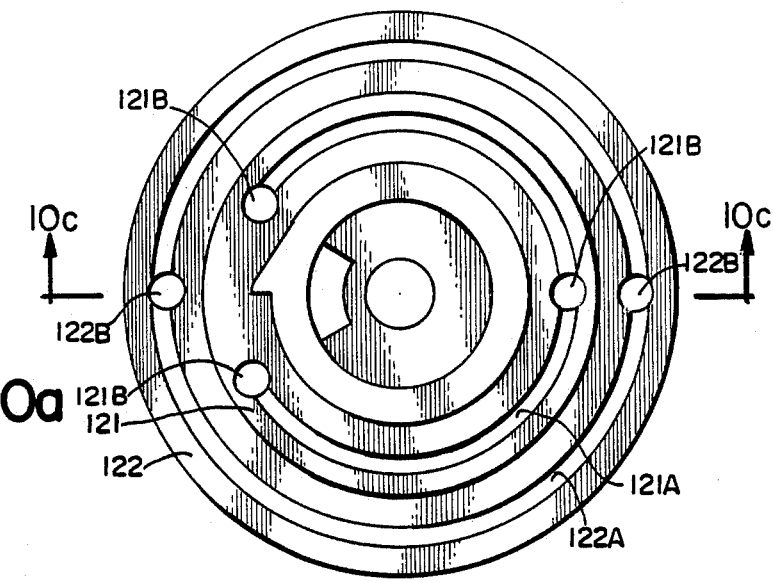
FIG. 10a is a top plan view of the disk hub made according to the second embodiment of this invention.
Figure 10B:
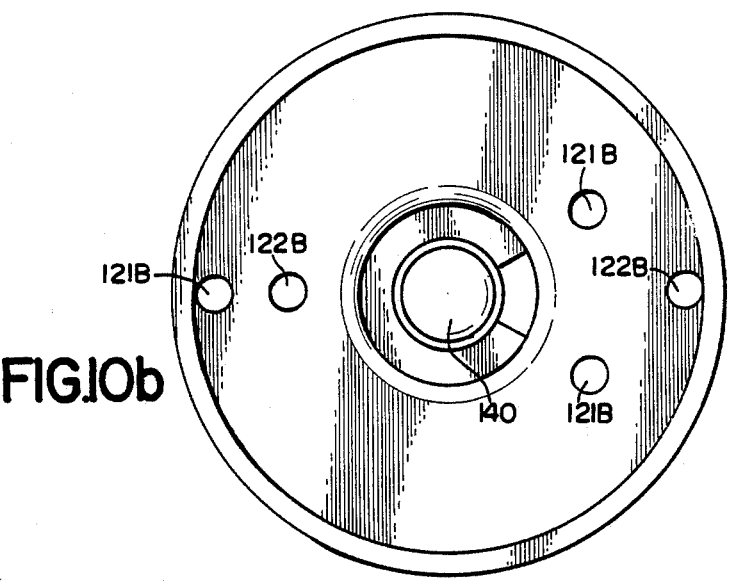
FIG. 10b is a bottom plan view of the disk hub made according to the second embodiment of this invention.
Figure 10C:
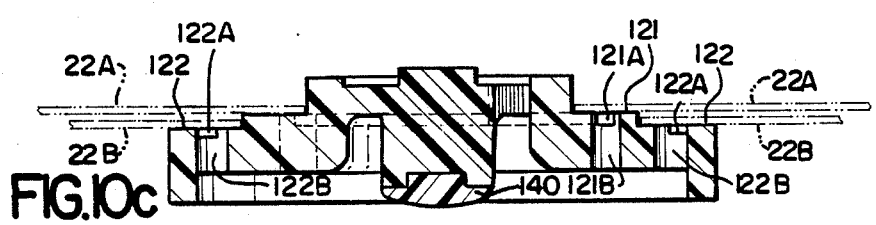
FIG. 10c is a cross sectional view of the disk hub of the second embodiment of this invention taken substantially along line 10c–10c of FIG. 10a, showing each disk and the hub to which they are attached.

Referring now to FIGS. 10a through 10c, the relationship between disk pair 22A/22B and disk hub 120 is revealed. Disk hub 120 contains two coaxial, axially spaced plateau surfaces: upper plateau 121 and lower plateau 122. Annular grooves 121A and 122A are contained within upper plateau 121 and lower plateau 122 respectively. Disk hub 120 may also contain apertures 121B and 122B which allow communication between the underside of the disk hub and annular slots 121A and 122A respectively. Upper disk 22A, shown by dash lines in FIG. 10c, is mounted to upper plateau surface 121 and lower disk 22B, also shown by dash lines in FIG. 10c, is mounted to lower plateau surface 122. The spacing between the disks is determined by the spacing between the respective plateau surfaces. In this embodiment, each disk is mounted directly to disk hub 122 and the need for a disk spacer between the disks is eliminated.

One procedure which may used for mounting each disk to its respective plateau surface is as follows: the disk is first held firmly against the plateau surface to which it is to be mounted; a fluid adhesive material is injected into the appropriate plateau aperture to fill the appropriate plateau annular slot; and the disk is held in this position until the adhesive dries within the annular slot. In this way, each disk is mounted to its respective plateau and the spacing between the disks is precisely controlled. However, it has been found that the fluid adhesive material used according to this method has a tendency to shrink upon drying. This shrinkage will in turn cause a disadvantageous crimping or wrinkling of the magnetic media. Accordingly, a more preferred method for mounting each disk to its respective plateau surface has been discovered. In this preferred method, a sheet of aluminum or steel having an annular groove of a precisely defined depth is provided. In the preferred embodiment of this invention, the groove is 0.076 mm deep and approximately 0.5 mm wide. An adhesive material is spread upon the aluminum sheet so as to insure that the annular groove is filled with the adhesive material. In a preferred embodiment of this invention, the adhesive material is a methylmethacrylate resin; and in a more preferred embodiment of this invention the adhesive is a material marketed under the trademark "DEPEND" by the Locktight Corporation. The glue is then screeded from the aluminum sheet so as to leave a uniform layer of glue 0.076 mm thick within the groove. A "TEFLON" transfer ring having a surface configuration corresponding approximately to plateau surface 122 is then moved into engagement with the glue contained within the groove, whereupon a thin layer of glue is transferred to the transfer ring. A thin film of initiator or activator is applied to plateau surface 122 and the transfer ring is then pressed into engagement with that surface so as to leave a thin layer of glue no greater than 0.076 mm thick thereupon. Disk 22B is then pressed into engagement with plateau surface 122 such that substantially all the glue is extruded from between the disks or into annular slot 122A. In this way, a firm bond is achieved with a glue layer of a negligible thickness relative to the disk spacing. The same procedure is then used to mount disk 22A to plateau surface 121. It should be noted that in this procedure, it is neither desirable or necessary to include apertures 121B and 122B in disk hub 120.

In the most preferred embodiment of this invention, it is desirable that disk hub 120 and disk pair 22A/22B have substantially the same coefficients of thermal expansion. This is an important feature of this invention since different coefficients of thermal expansion may cause a buckling or warping of one disk with respect to the other. It will be appreciated by those skilled in the art, however, that achieving this objective is a relatively difficult task since the polyester film commonly used for the floppy disk is inherently flexible; on the other hand it is necessary that the disk hub of this invention be relatively rigid and hard. Accordingly, it has been discovered that a disk hub comprised of 20 to 30% glass filled polycarbonate has substantially the same coefficient of thermal expansion as the polyester film used for the floppy disk pair.

In the second embodiment of this invention, it may also be desirable to modify concentric knob 26 of disk hub 18 of the first embodiment (see FIG. 3c) to include an integrally attached bearing surface 140 as shown in FIG. 10c. This bearing surface 140 is employed to increase the longevity of a cartridge made according to this invention. That is, substantial wear of the surface upon which the disk pair rotates, i.e., concentric knob 26 in the first embodiment or bearing surface 140 in the second embodiment, may cause improper rotation of the disk pair or imprecise alignment of the disk pair with the drive spindle of this invention. More particularly, a disk hub having an overly worn or unevenly worn concentric knob 26 may tend to wander or become misaligned when coupled to the motor of the disk drive. In addition, it is clear that wearing of the concentric knob 26 of the first embodiment of this invention may cause debris to be deposited within the disk cartridge and interfere with transduction of data to and from the floppy disk pair. Accordingly, bearing material 140 is chosen so as to provide a high wear, long lasting surface upon which the disk hub 120 can rotate. In the preferred embodiment of this invention, bearing material 140 is composed of a "TEFLON" impregnated polyimide. The most preferred material is available from Rogers Corporation and is sold under the trademark "ENVEX 1228".

While particular embodiments of this invention have been shown and described, modifications are within the spirit and scope of the invention. The appended claims, therefore, cover all such modifications.

What is claimed is:

1. An improved magnetic storage and retrieval device having: a disk drive; a flexible magnetic disk contained in a rigid apertured cartridge; a drive spindle contained within said disk drive and having access to the flexible magnetic disk for rotating the disk; and a transducer contained within said disk drive and having access to the magnetic disk through the aperture in the cartridge for storage and retrieval of data to and from the magnetic disk, wherein the improvement comprises:
    (a) a spicule member mounted to the disk drive, said spicule member having a spicule reference surface;
    (b) a Bernoulli surface comprising the interior apertured surface of the cartridge;
    (c) a cartridge reference surface integral with said Bernoulli surface and proximate to the cartridge aperture;
    (d) means for holding and flattening said cartridge reference surface against said spicule reference surface; and
    (e) means for movably mounting said transducer to said spicule member such that said transducer is only movable in a plane substantially parallel to the disk.

2. The improved magnetic storage and retrieval device recited in claim 1 further comprising a drive spindle mounted to said spicule member such that said drive spindle is in rotational engagement with said disk.

* * * * *